(12) United States Patent
Nirei (10) Patent No.: US 9,718,399 B2
(45) Date of Patent: Aug. 1, 2017

(54) LIGHT GUIDE DEVICE

(71) Applicant: CALSONIC KANSEI CORPORATION, Saitama (JP)

(72) Inventor: Tsuyoshi Nirei, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 183 days.

(21) Appl. No.: 14/435,861

(22) PCT Filed: Sep. 19, 2013

(86) PCT No.: PCT/JP2013/075372
§ 371 (c)(1),
(2) Date: Apr. 15, 2015

(87) PCT Pub. No.: WO2014/061394
PCT Pub. Date: Apr. 24, 2014

(65) Prior Publication Data
US 2015/0291092 A1 Oct. 15, 2015

(30) Foreign Application Priority Data

Oct. 16, 2012 (JP) ................................ 2012-228994

(51) Int. Cl.
*B60Q 3/04* (2006.01)
*G01D 11/28* (2006.01)
*B60K 37/02* (2006.01)
*B60K 35/00* (2006.01)
(Continued)

(52) U.S. Cl.
CPC ............. *B60Q 3/044* (2013.01); *B60K 35/00* (2013.01); *B60K 37/02* (2013.01); *B60Q 3/14* (2017.02);
(Continued)

(58) Field of Classification Search
CPC ........ B60Q 3/044; B60K 35/00; B60K 37/02; G01D 11/28
See application file for complete search history.

(56) References Cited

U.S. PATENT DOCUMENTS 2,140,972 A * 12/1938 Rylsky .................. G01D 11/28
116/287
2004/0135679 A1 7/2004 Kushida et al.
(Continued)

FOREIGN PATENT DOCUMENTS

CN 1504359 6/2004
CN 101163916 4/2008
(Continued)

OTHER PUBLICATIONS

International Search Report issued Dec. 3, 2013 in International (PCT) Application No. PCT/JP2013/075372.

*Primary Examiner* — Anh Mai
*Assistant Examiner* — Nathaniel Lee
(74) *Attorney, Agent, or Firm* — Wenderoth, Lind & Ponack, L.L.P.

(57) ABSTRACT

A light guide device that performs uniform brightness transmitted light illumination regardless of a distance from an incident portion is provided. Light that is emitted from a light source, and enters from an incident portion of a light guide member (light guide body) made of a translucent member formed along an outer edge portion of a decorated portion, travels in the light guide portion while repeating total reflection by an inner surface of the light guide member. In the light-guiding portion, the light is guided in the decorated portion made of a translucent member from the inside of the light guide member, and is emitted outside by being scattered by the inside of the decorated portion, and in the non-light-guiding portion, the light that travels in the light guide member is prevented from traveling in the decorated portion.

20 Claims, 8 Drawing Sheets

(51) Int. Cl.
  *B60Q 3/14* (2017.01)
  *F21V 8/00* (2006.01)
(52) U.S. Cl.
  CPC ........ *G01D 11/28* (2013.01); *B60K 2350/203* (2013.01); *B60K 2350/2043* (2013.01); *B60K 2350/2056* (2013.01); *G02B 6/001* (2013.01)

(56) References Cited

U.S. PATENT DOCUMENTS

| | | |
|---|---|---|
| 2006/0185576 A1 | 8/2006 | Tane |
| 2008/0002386 A1* | 1/2008 | Mezouari ............... G01D 11/28 362/23.16 |
| 2008/0266832 A1 | 10/2008 | Tamura |
| 2009/0027589 A1 | 1/2009 | Yamazoe et al. |
| 2011/0051393 A1 | 3/2011 | Ishikawa et al. |
| 2011/0128470 A1 | 6/2011 | Yorita et al. |
| 2013/0114240 A1* | 5/2013 | Makita .................. G01D 13/28 362/23.19 |

FOREIGN PATENT DOCUMENTS

| | | |
|---|---|---|
| CN | 102007434 | 4/2011 |
| EP | 1 986 025 | 10/2008 |
| JP | 7-248385 | 9/1995 |
| JP | 10-207408 | 8/1998 |
| JP | 2003-302262 | 10/2003 |
| JP | 2004-134223 | 4/2004 |
| JP | 2006-267081 | 10/2006 |
| JP | 2007-178282 | 7/2007 |
| JP | 2008-270055 | 11/2008 |
| WO | 2009/128516 | 10/2009 |

\* cited by examiner

LIGHT GUIDE DEVICE

TECHNICAL FIELD

The present invention relates to a light guide device for use in illumination of an instrument of a vehicle such as a speed meter and a tachometer.

BACKGROUND ART

So-called transmitted light illumination is used for illuminating an instrument of a vehicle such as a speed meter and a tachometer. In such transmitted light illumination, illumination light emitted from a light source referred to as a backlight irradiates a dial from a rear surface thereof, and the illumination light is transmitted through only portions corresponding to characters and scales of a speed meter and a tachometer printed on the dial, so as to illuminate the dial.

As a method of achieving the transmitted light illumination, a display in which characters and/or scales in a dial are illuminated, with the transmitted light illumination has been proposed (for example, Patent Document 1). The display is configured to guide light which enters a light guide plate from an incident portion of the light guide plate disposed in the rear surface of the dial to the entire light guide plate through total reflection, and to emit outside a part of the light guided in the light guide plate, so as to illuminate the characters and the scales of the dial.

CITATION LIST

Patent Document

Patent Document 1: Japanese Patent Application Publication No. 2003-302262

SUMMARY OF INVENTION

Problem to Solution

However, according to the invention described in Patent Document 1, the light traveling in the light guide plate gradually attenuates in accordance with a distance from the incident portion. Consequently, the amount of light emitted from the light guide plate decreases in accordance with an increase in distance from the incident portion, thereby, the amount of illumination light which reaches the scales (reflection portion) decreases. For this reason, unequal brightness of illumination is obtained in accordance with a distance from the incident portion.

The present invention has been made in view of the above-described circumstances. An object of the present invention is to provide a light guide device which is configured to enable transmitted light illumination with equal brightness regardless of a distance from an incident portion.

Solution to Problem

A light guide device according to one embodiment of the present invention aims to guide light which enters a light guide body and emit the guided light outside from a decorated portion, so as to uniformly illuminate the decorated portion by transmitted light illumination.

More specifically, a light guide device includes a light source, a light guide body including an incident portion that light emitted from the light source enters, the light guide body being made of a translucent material that guides the light from the incident portion, and a decorated portion that is disposed to have contact with the light guide body, the decorated portion being made of a translucent material that guides the light guided in the light guide body to be emitted outside by scattering the guided light, wherein the light guide body includes a light-guiding portion and a non-light-guiding portion that are disposed along an outer edge portion of the decorated portion, the light-guiding portion guides the light guided in the light guide body in the decorated portion, and the non-light guiding portion prevents the light guided in the light guide body from being guided in the decorated portion.

Advantageous Effects of Invention

According to a light guide device described in one embodiment of the present invention, an effect which illuminates a decorated portion by uniform brightness transmitted light illumination regardless of a distance from an incident portion is obtained.

DESCRIPTION OF EMBODIMENT

Hereinafter, an embodiment of a vehicle display to which a light guide device according to one embodiment of the present invention is applied will be described with reference to the drawings.

Embodiment 1

The specific embodiment of the present invention will be described with reference to the drawings.

Figure 1:
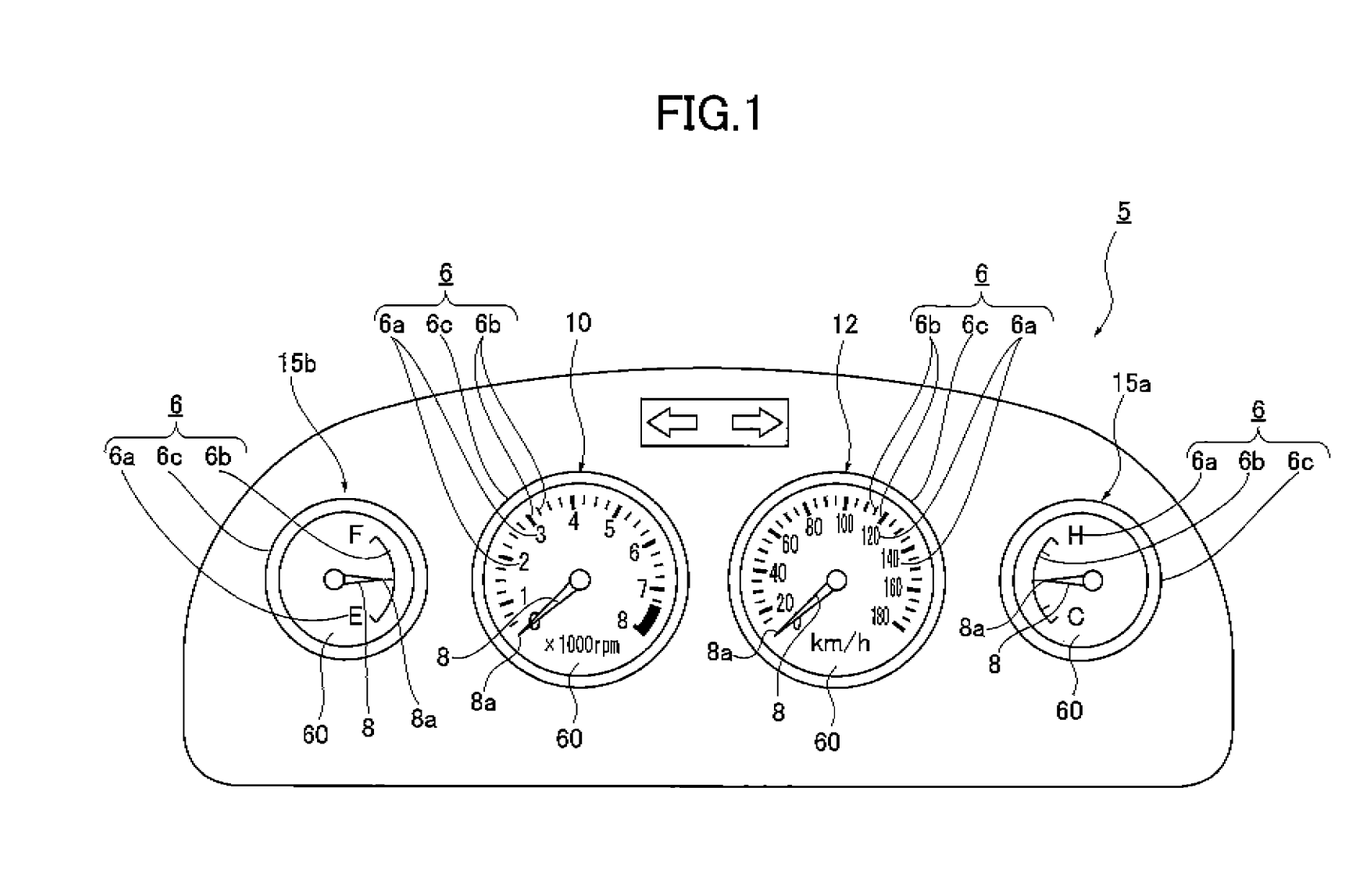
FIG. 1 is a front view showing a vehicle display to which a light guide device according to one embodiment of the present invention is applied.

A vehicle display 5 to which the present invention is applied is disposed in a vehicle interior to be viewable by a driver. As illustrated in FIG. 1, the vehicle display 5 includes a tachometer 10 to display an engine speed and a speed meter 12 to display a vehicle speed. The vehicle display 5 also includes a water temperature meter 15a and a fuel meter 15b as other auxiliary meters.

In FIG. 1, each of the tachometer 10, speed meter 12, water temperature meter 15a, and fuel meter 15b includes a dial 60 on which indication values of each instrument are printed. The dial 60 includes on the circumferential edge thereof a mark 6 disposed along an arc-like movement trajectory of a leading end portion 8a of an indicating needle 8.

The mark 6 includes a plurality of characters 6a, a plurality of scales 6b, and a circumferential edge portion 6c as designs.

Figure 2A:
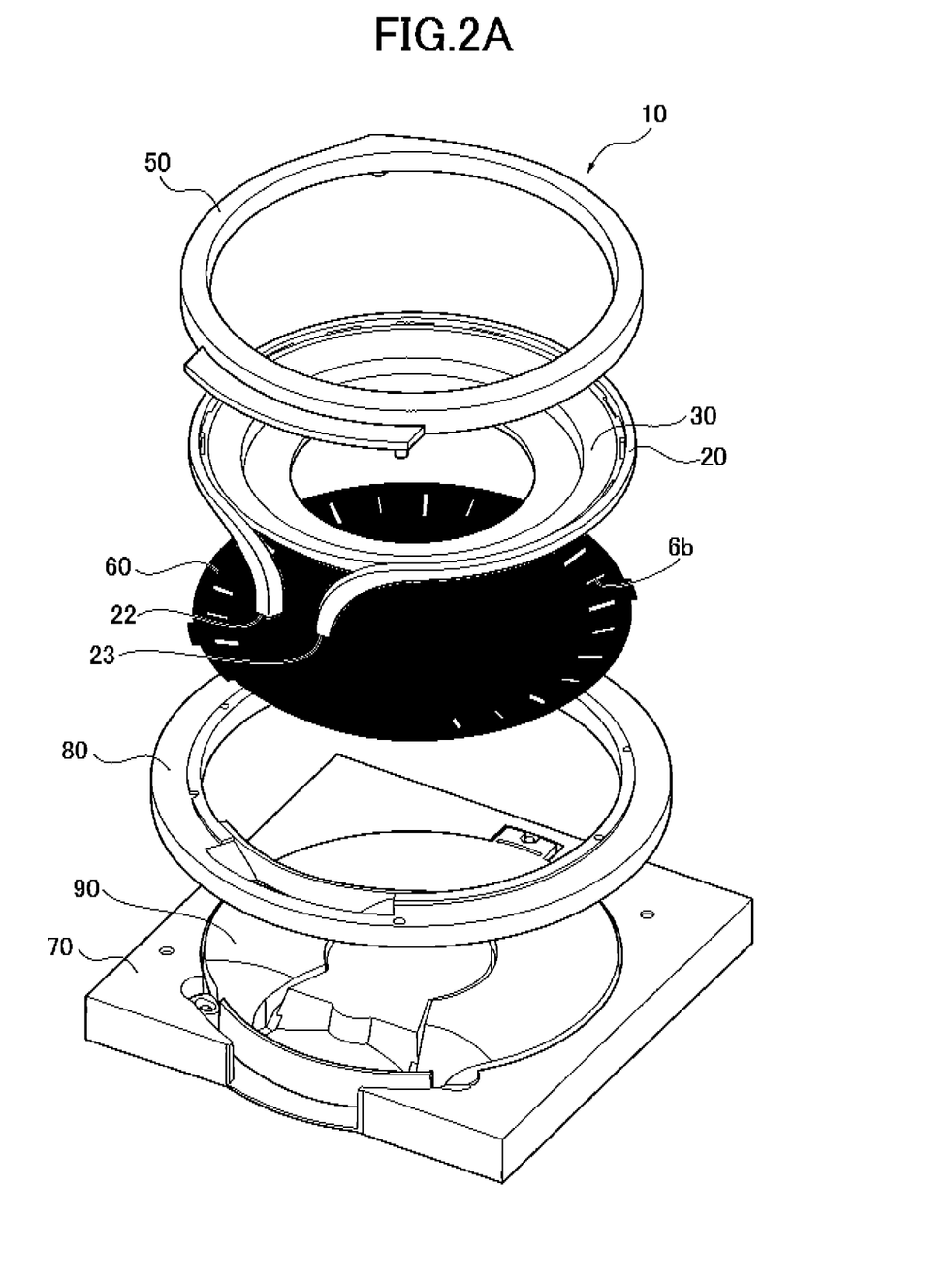
FIG. 2A is a perspective view showing components of a tachometer in the vehicle display to which the light guide device according to one embodiment of the present invention is applied.
Figure 2B:
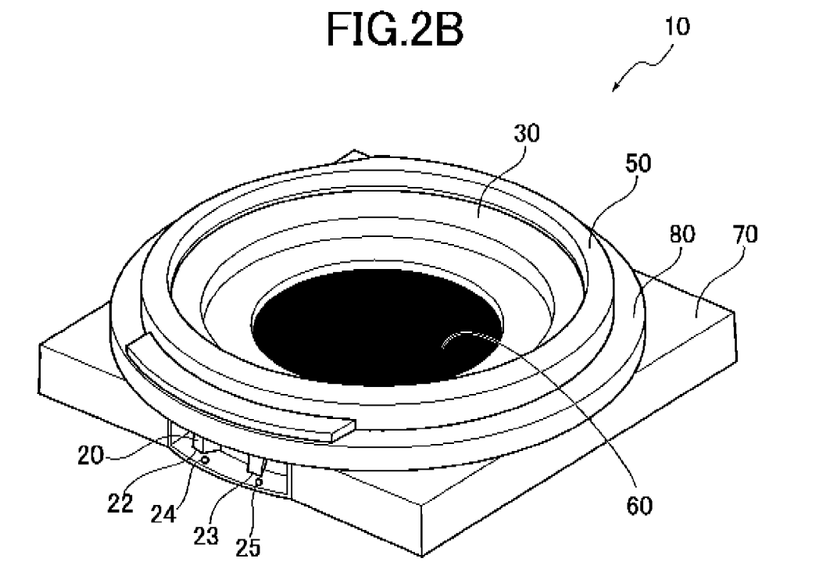
FIG. 2B is a perspective view showing the tachometer in which the components shown in FIG. 2A are assembled.
Figure 2C:
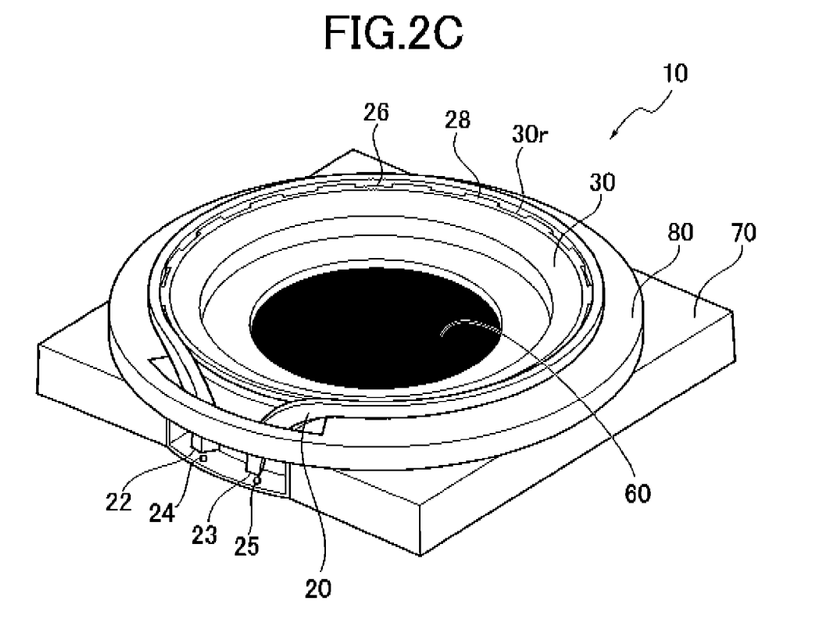
FIG. 2C is a perspective view showing the tachometer from which a finisher ring is removed.

FIGS. 2A to 2C are perspective views illustrating a schematic structure of the tachometer 10 in FIG. 1.

The tachometer 10 includes a lower housing member 70 as a base material, an illumination member 90, a dial 60 having the scales 6b as the designs of the tachometer, a light guide member 20, a transparent decorated portion 30, a shade 80, and a finisher ring 50. The illumination member 90 is housed in a concave portion of the lower housing member 70 to illuminate the dial 60 from the rear surface thereof. The light guide member 20, which is a transparent light guide body having translucency, includes on one end thereof an incident portion 22 and on the other end thereof an incident portion 23. The light guide member 20 includes a circular shape having a rectangular section, and is made of, for example, polycarbonate or acrylic resin. The decorated portion 30 has translucency, is provided to have contact with the inner edge portion of the light guide member 20, and is made of, for example, polycarbonate or acrylic resin. The shade 80 is provided to have contact with the outer edge of the light guide member 20, and to prevent the leakage of the light to the outside from the light guide member 20 and the decorated portion 30. The finisher ring 50 engages with the light guide member 20 from above.

The components illustrated in FIG. 2A are assembled as illustrated in FIG. 2B to configure the tachometer 10. A light source 24 made of a super luminosity LED is disposed in the incident portion 22 provided in one end portion of the light guide member 20, and the light emitted from the light source 24 enters the light guide member 20 from the incident portion 22. A light source 25 made of a super luminosity LED is also disposed in the incident portion 23 provided in the other end portion of the light guide member 20. The light emitted from the light source 25 also enters the light guide member 20 from the incident portion 23.

In addition, each of the incident portions 22, 23 is formed by bending the light guide body, for example, the light guide member 20 in the rear surface direction of the lower housing member 70 (namely, rear surface direction of dial 60). This configuration is to ensure a space for disposing the light sources 24, 25 for the incident portions 22, 23 without expanding the space of the dial 60 in the radial direction.

FIG. 2C is a perspective view illustrating the tachometer 10 from which the finisher ring 50 is removed.

The light emitted from the light source 24 enters the incident portion 22 of the light guide body, for example, the light guide member 20, repeats the total reflection inside the light guide member 20, and travels in the clockwise direction in FIG. 2C. The light emitted from the light source 25 also enters the incident portion 23 of the light guide member 20, repeats total reflection inside the light guide member 20, and travels in the counterclockwise direction in FIG. 2C.

A light-guiding portion 26, which guides in the decorated portion 30 the light guided in the light guide member 20, and a non-light-guiding portion 28, which prevents the light guided in the light guide member 20 from guiding in the decorated portion 30, are alternately formed in a boundary portion of the light guide member 20 and the decorated portion 30 in a direction along an outer edge portion 30r of the decorated portion 30.

Figure 3:
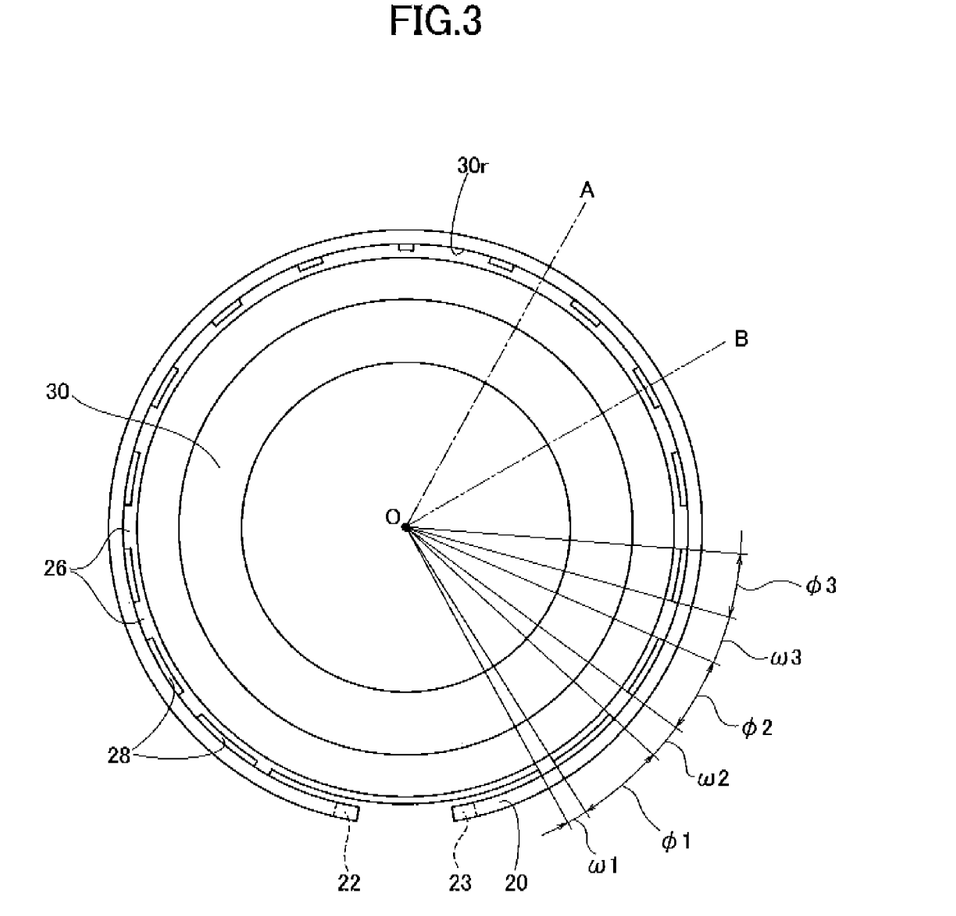
FIG. 3 is a top view of a light guide member and a decorated portion, showing a formation example of a light-guiding portion and a non-light-guiding portion.

Next, the configurations of the light-guiding portion 26 and the non-light-guiding portion 28 will be described based on FIGS. 3, 6A, 6B. FIG. 3 is a top view of the light guide member 20 and the decorated portion 30 illustrated in FIG. 2A.

As illustrated in FIG. 3, the light-guiding portions 26 are formed in the outer edge portion 30r of the decorated portion 30 along the circumferential direction of the outer edge portion 30r of the decorated portion 30. The length of each light-guiding portion 26 along the outer edge portion 30r of the decorated portion 30 increases with distance from the incident portions 22, 23. The amount of light which is guided to the decorated portion 30 from the light-guiding portions 26 is thereby limited in positions close to the incident portions 22, 23.

That is, in FIG. 3, the light-guiding portions 26 are formed to have a relationship of $\omega 1 < \omega 2 < \omega 3 < \ldots < \omega n$ in a range from the incident portion 23 to the most distant point in the circle constituting the light guide member 20. The lengths of the light-guiding portions 26 along the outer edge portion 30r, which are obtained in order from the incident portion 23 side in the counterclockwise direction, are represented as visible angles including the light-guiding portion 26 from the center O of the circle constituting the light guide member 20, and the visible angles are represented as $\omega 1$, $\omega 2$, $\omega 3$, ..., $\omega n$ in order from the incident portion 23 side in the counterclockwise direction.

Although not illustrated in the figures, the lengths of the light-guiding portions 26 along the outer edge portion 30r, which are obtained in order from the incident portion 22 side in the clockwise direction, have a relationship similar to the above.

On the other hand, as illustrated in FIG. 3, the non-light-guiding portions 28 are also formed in the outer edge portion 30r of the decorated portion along the circumferential direction of the outer edge portion 30r of the decorated portion 30. The length of each of the non-light-guiding portions 28 along the outer edge portion 30r of the decorated portion 30 decreases with distance from the incident portions 22, 23. The amount of light which is guided to the decorated portion 30 from the light-guiding portion 26 is thereby limited in positions close to the incident portions 22, 23.

That is, in FIG. 3, the non-light-guiding portions 28 are formed to have a relationship of $\phi 1 > \phi 2 > \phi 3 > \ldots > \phi m$ in a range from the incident portion 23 to the most distant point of the circle constituting the light guide member 20. The lengths of the non-light-guiding portions 28 along the outer edge portion 30r, which are obtained in order from the incident portion 23 side in the counterclockwise direction, are represented as visible angles including the non-light-guiding portion 28 from the center O of the circle constituting the light guide portion 20, and the visible angles are represented as $\phi 1$, $\phi 2$, $\phi 3$, ..., $\phi n$ in order from the incident portion 23 side in the counterclockwise direction.

Although not illustrated in the figures, the lengths of the non-light-guiding portions 28 along the outer edge portion 30r, which are obtained in order from the incident portion 22 side in the clockwise direction, have a relationship similar to the above.

A method of forming the light-guiding portions 26 and the non-light-guiding portions 28 is not limited to the method shown in FIG. 3. Namely, the light-guiding portion 26 and the non-light-guiding portion 28 may be formed as illustrated in FIGS. 4, 5.

Figure 4:
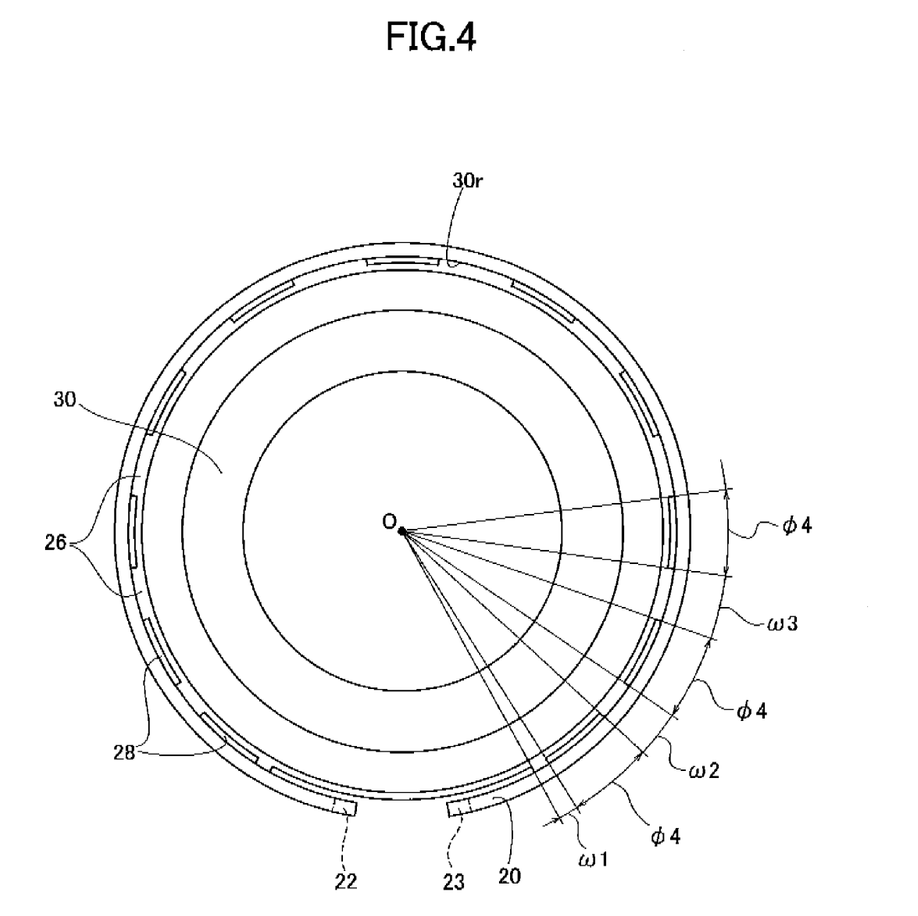
FIG. 4 is a top view of a light guide member and a decorated portion, showing a second formation example of a light-guiding portion and a non-light-guiding portion.
Figure 5:
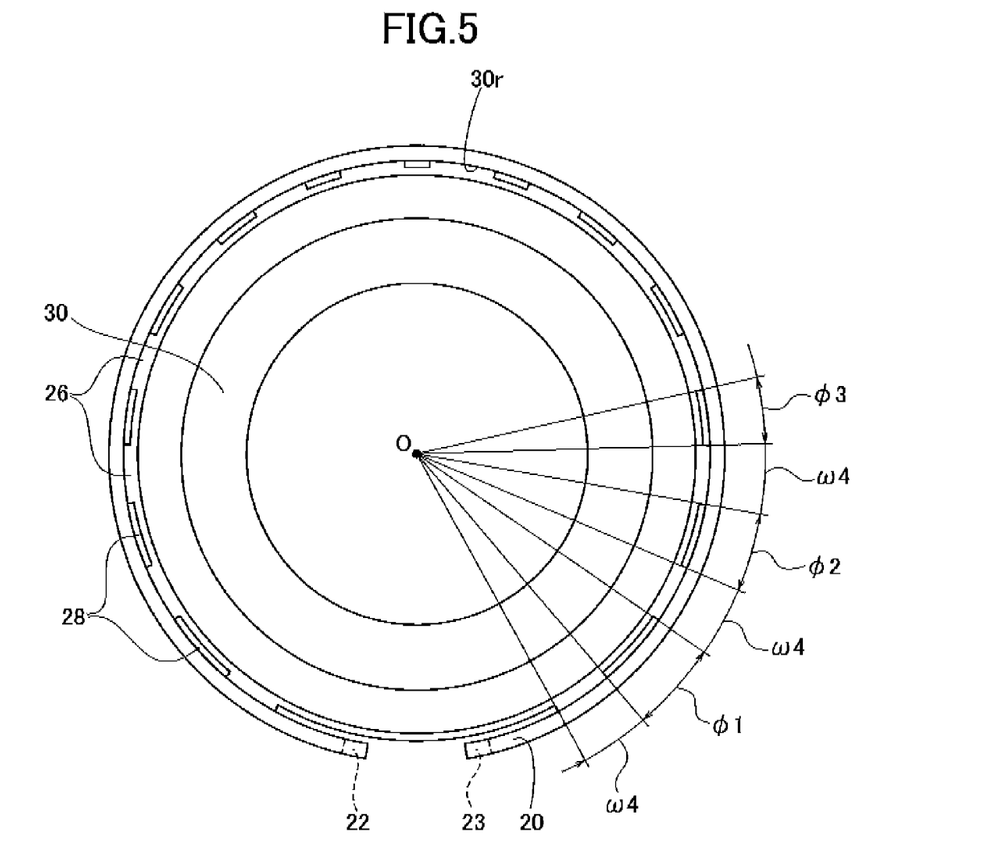
FIG. 5 is a top view of a light guide member and a decorated portion, showing a third formation example of a light-guiding portion and a non-light-guiding portion.

In FIG. 4, the light-guiding portions 26 are formed in the outer edge portion 30r of the decorated portion 30 along the circumferential direction of the outer edge portion 30r of the decorated portion 30. The length of each light-guiding portion 26 along the outer edge portion 30r of the decorated portion 30 increases with distance from the incident portions 22, 23. The amount of light which is guided to the decorated portion 30 from the light-guiding portions 26 is thereby limited in positions close to the incident portions 22, 23.

That is, in FIG. 4, the light-guiding portions 26 are formed to have a relationship of $\omega 1 < \omega 2 < \omega 3 < \ldots < \omega n$ in a range from the incident portion 23 to the most distant point in the circle constituting the light guide member 20. The lengths of the light-guiding portions 26 along the outer edge portion 30r, which are obtained in order from the incident portion 23 side in the counterclockwise direction, are represented as visible angles including the light-guiding portion 26 from the center O of the circle constituting the light guide member 20, and the visible angles are represented as $\omega 1$, $\omega 2$, $\omega 3$, ..., $\omega n$ in order from the incident portion 23 side in the counterclockwise direction.

Although not illustrated in the figures, the lengths of the light-guiding portions 26 along the outer edge portion 30r, which are obtained in order from the incident portion 22 side in the clockwise direction, have a relationship similar to the above.

In FIG. 4, the lengths of the non-light-guiding portions 28 along the outer edge portion 30r of the decorated portion 30 are equal regardless of the distances from the incident portions 22, 23.

That is, in FIG. 4, the lengths of the non-light-guiding portions 28 along the outer edge portion 30r, which are obtained in order from the incident portion 23 side in the counterclockwise direction, are represented as visible angles including the non-light-guiding portion 28 from the center O of the circle constituting the light guide member 20, and the visible angles are represented as $\phi 4$. The visible angles $\phi 4$ of all of the non-light-guiding portions 28 are equal.

Forming the light-guiding portions 26 and the non-light guiding portions 28 as illustrated in FIG. 4 enables further uniform transmitted light illumination to the decorated portion 30 even in a position away from the incident portions 22, 23.

In FIG. 5, the lengths of the light-guiding portions 26 are equal regardless of the distances from the incident portions 22, 23.

In FIG. 5, the non-light-guiding portions 28 are formed in the outer edge portion 30r of the decorated portion 30 along the circumferential direction of the outer edge portion 30r of the decorated portion 30. The length of each non-light-guiding portion 28 along the outer edge portion 30r of the decorated portion 30 decreases with distance from the incident portions 22, 23. The amount of light which is guided to the decorated portion 30 from the light-guiding portions 26 is thereby limited in positions close to the incident portions 22, 23.

That is, in FIG. 5, the non-light-guiding portions 28 are formed to have a relationship of $\phi 1 > \phi 2 > \phi 3 > \ldots > \phi n$ in a range from the incident portion 23 to the most distant point of the circle constituting the light guide member 20. The lengths of the non-light-guiding portions 28 along the outer edge portion 30r, which are obtained in order from the incident portion 23 side in the counterclockwise direction, are represented as visible angles including the non-light-guiding portion 2628 from the center O of the circle constituting the light guide portion 20, and the visible angles are represented as $\phi 1$, $\phi 2$, $\phi 3$, ..., $\phi n$ in order from the incident portion 23 side in the counterclockwise direction.

Although not illustrated in the figures, the lengths of the non-light-guiding portions 28 along the outer edge portion 30r, which are obtained in order from the incident portion 22 side in the clockwise direction, have a relationship similar to the above.

In FIG. 5, the lengths of the light-guiding portions 26 are equal regardless of the distances from the incident portions 22, 23.

That is, in FIG. 5, where the lengths of the light-guiding portions 26 along the outer edge portion 30r, which are obtained in order from the incident portion 23 side in the counterclockwise direction, are represented as visible angles including the light-guiding portion 2826 from the center O of the circle constituting the light guide member 20, the visible angles are represented as $\omega 4$. The visible angles $\omega 4$ of all of the light-guiding portions 26 are equal.

Forming the light-guiding portions 26 and the non-light-guiding portions 28 as illustrated in FIG. 5 enable further uniform transmitted light illumination to the decorated portion 30 even in a position away from the incident portions 22, 23.

Figure 6A:
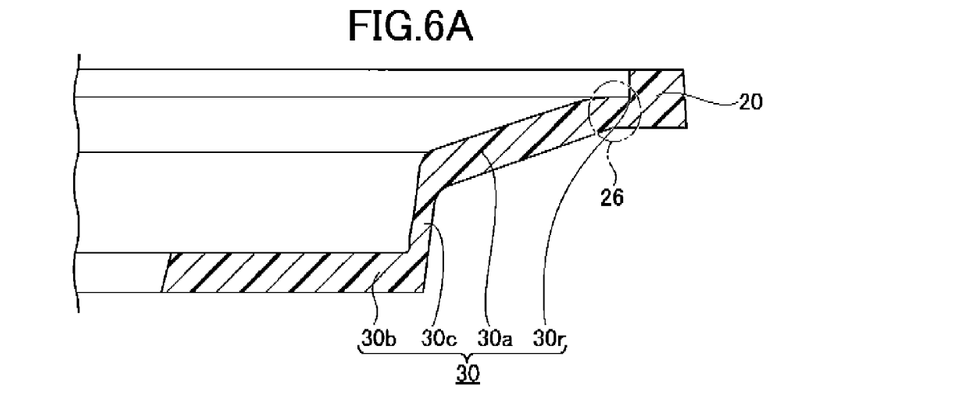
FIG. 6A is a sectional view (O-A section) of the light-guiding portion in FIG. 3.

FIG. 6A shows a sectional view of the light guide member 20 in FIG. 3 along a half line OA having the center O of the circle as one end and passing through the light-guiding portion 26. FIG. 6B also shows a sectional view of the light guide member 20 in FIG. 3 along a half line OB having the center O of the circle as one end and passing through the non-light-guiding portion 28.

As illustrated in FIG. 6A, the decorated portion 30 is connected with the light-guiding portion 26 at the outer edge portion 30r. The decorated portion 30 includes a first decorated portion 30a, a second decorated portion 30b, and a third decorated portion 30c. The first decorated portion 30a is made of a plane which tilts into a mortar shape from the connected part between the decorated portion 30 and the light guide member 20 toward the center of the circle by the light guide member 20 in a direction away from the light guide member 20. The second decorated portion 30b is made of a plane substantially parallel to the plane formed by the circle by the light guide member 20. The third decorated portion 30c is made of a plane which connects the first decorated portion 30a and the second decorated portion 30b.

The light which has reached the light-guiding portion 26 travels inside the first decorated portion 30a from the connected part between the decorated portion 30 and the light guide member 20, and is guided in the decorated portion 30.

Figure 6B:
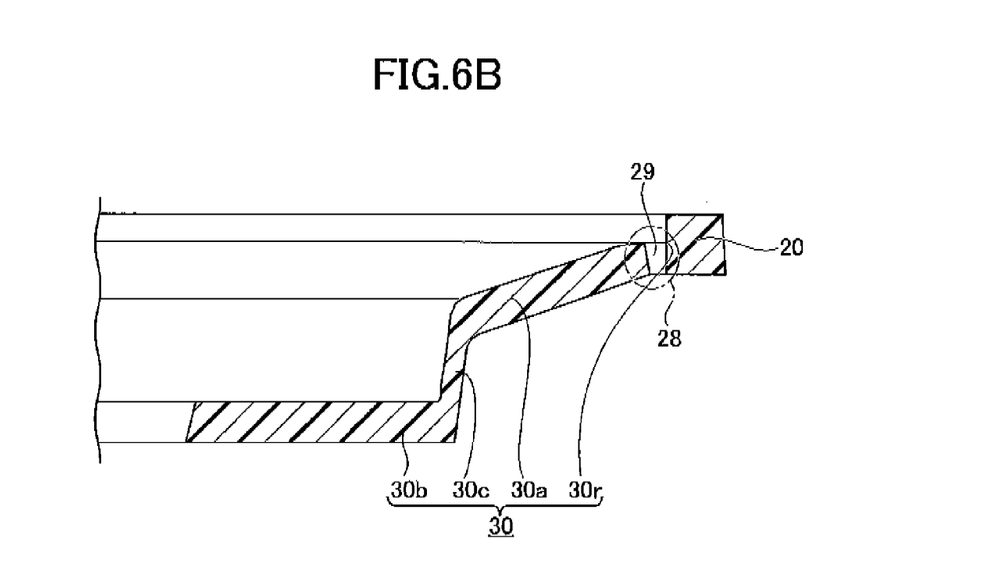
FIG. 6B is a sectional view (O-B section) of the non-light-guiding portion in FIG. 3.

On the other hand, as illustrated in FIG. 6B, in, the non-light-guiding portion 28, the light guide member 20 and the decorated portion 30 are separated, and a space 29 is provided between the light guide member 20 and the decorated portion 30.

The light which has reached the space 29 forming the non-light-guiding portion 28 is accumulated in the light guide member 20 without being guided to the decorated portion 30. Thus, the light which has reached the space 29 is not guided in the decorated portion 30.

Next, the sectional structure of the tachometer 10, the path of the light guided in the decorated portion 30, and the structure which performs the transmitted light illumination, to the dial 60 will be described with reference to FIG. 7.

Figure 7:
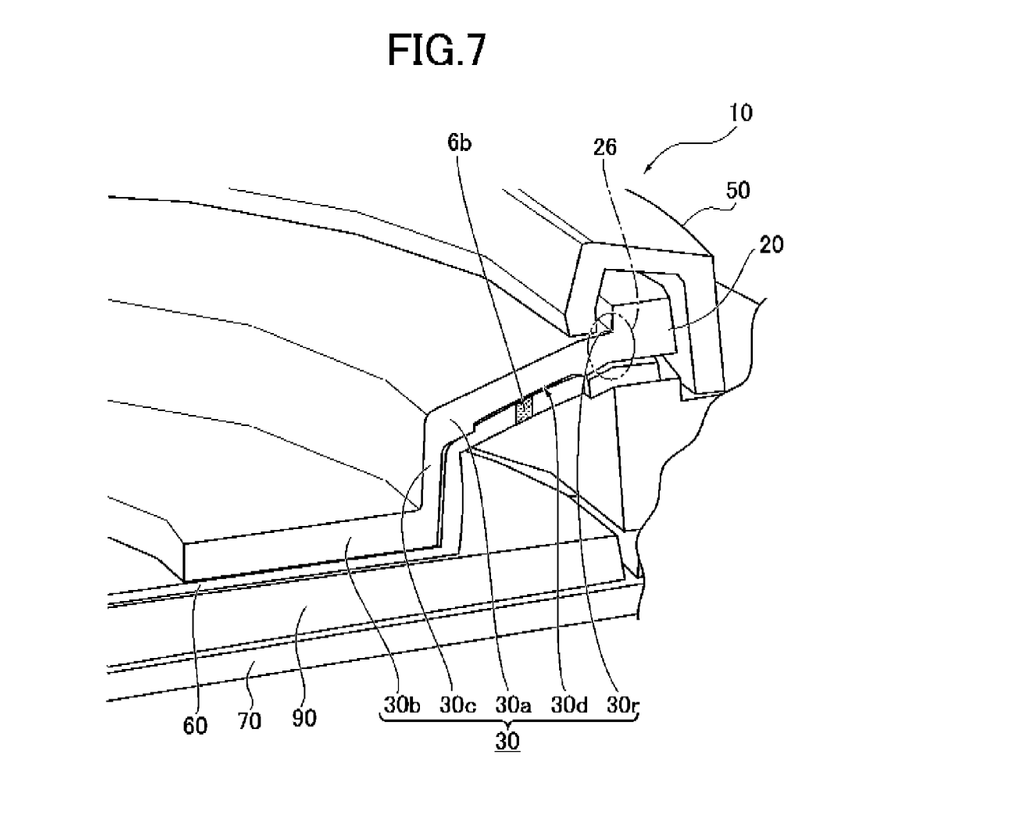
FIG. 7 is a view showing a sectional structure of the tachometer and describing a path of light guided in the decorated portion.

As illustrated in FIG. 7, a surface process such as texturing, embossing, or micro embossing is performed to the rear surface of the first decorated portion 30a, so that an illumination adjustment portion 30d is formed in the rear surface of the first decorated portion 30a. The light guided to the first decorated portion 30a through the light-guiding portion 26 from the light guide member 20 is reflected and scattered by the illumination adjustment portion 30d, is guided to the surface of the first decorated portion 30a, and is emitted outside from the surface of the first decorated portion 30a.

The dial 60 is attached to the rear surface of the first decorated portion 30a to have contact with the rear surface of the first decorated portion 30a. The scales 6b as designs are provided in the dial 60, and the region including the scales 6b is disposed to have contact with the rear surface of the first decorated portion 30a. In addition, the scales 6b are formed by providing holes in the dial 60, and have permeability.

An illumination member 90 made of an optical-guiding member is disposed in the rear surface of the dial 60 to illuminate the scales 6b of the dial 60 as the designs from the rear surface thereof. Additionally, the illumination member 90 is made of a transparent light-guiding member. For example, the light incident from the outside of the illumination member 90 is guided to the illumination member 90, so that the illumination member 90 is uniformly illuminated. Since the illumination member 90 is generally used for back light illumination of a vehicle instrument, the detailed description thereof will be omitted.

The light which has transmitted through the scales 6b is transmitted through the first decorated portion 30a, and is emitted outside. The scales 6b of the dial 60 as the designs are therefore illuminated, with the transmitted light.

As described above, the general configuration of the tachometer 10 is described. The configurations of the speed meter 12, the water temperature meter 15a, and the fuel meter 15b are similar to the configuration of the tachometer 10. Thus, the descriptions thereof will be omitted.

Next, the operation of the vehicle display 5 according to one embodiment of the present invention will be described with reference to the tachometer 10, which is a part of the vehicle display 5, by using FIGS. 2C, 8.

At first, the light behavior inside the light guide member 20 will be described with reference to FIG. 2C.

In FIG. 2C, the light emitted from the light sources 24, 25 enters the light guide member 20 from the incident portions 22, 23. In the present embodiment, a blue LED is used as the light sources 24, 25.

Hereinafter, the behavior of the light which is emitted from the light source 24, and enters the light guide member 20 from the incident portion 22 will be described. In addition, although the traveling direction of the light which is emitted from the light source 25, and enters the light guide member 20 from the incident portion 23 is opposite to that of the light which is emitted from the light source 24, and enters the light guide member 20 from the incident portion 22, the behavior of the light which is emitted from the light source 25, and enters the light guide member 20 from the incident portion 23 is the same as that of the light which is emitted from the light source 24, and enters the light guide member 20 from the incident portion 22. Thus, the detailed description thereof will be omitted.

The blue light which illuminates the inner surface of the light guide member 20 at a shallow angle of a predetermined angle (optimum angle θc) or below is not emitted outside the light guide member 20, repeats the total reflection at an emission angle equal to an incident angle, and is guided to the back portion of the light guide member 20.

For example, when the light guide member 20 is made of polycarbonate, the optimum angle θc is determined based on the refractive index $n_1$ of the polycarbonate=1.58 and the refractive index $n_2$ of air having contact with the outside of the light guide member 20=1.00. Thus, $θc=\sin^{-1}(n_2/n_1)=39°$.

The light which enters the inner surface of the light guide member 20 at an angle larger than 39° relative to the normal direction toward the inner surface of the light guide member 20 is totally reflected, and is guided in the light guide member 20.

Next, the behavior of the light guided to the first decorated portion 30a from the light guide member 20 will be described with reference to FIG. 8.

Figure 8:
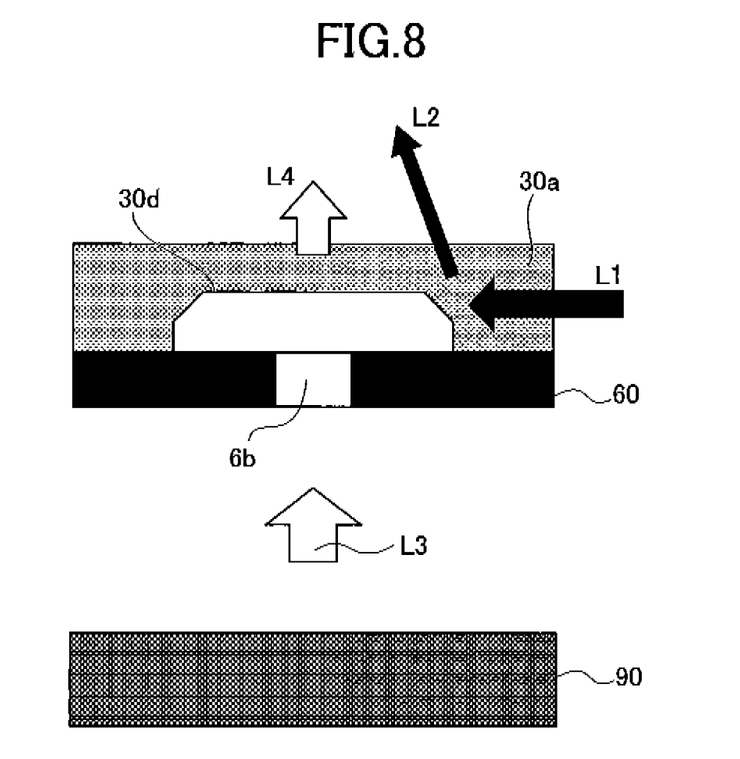
FIG. 8 is a view describing a path of light which is guided in the decorated portion and transmitted through a dial.

A light beam L1 which has reached the light-guiding portion 26 is guided in the first decorated portion 30a in the light-guiding portion 26, as illustrated in FIG. 8.

On the other hand, although not illustrated in FIG. 8, the blue light which has reached the non-light-guiding portion 28 is prevented from entering the first decorated portion 30a by the space 29, and is guided toward the back side of the light guide member 20.

As described above, the light-guiding portions 26 are formed such that the length of each light-guiding portion 26 along the outer edge portion 30r of the decorated portion 30 increases with distance from the incident portions 22, 23, and the non-light-guiding portions 28 are formed such that the length of each non-light-guiding portion 28 along the outer edge portion 30r of the decorated portion 30 decreases with distance from the incident portions 22, 23. With this configuration, the amount of blue light which enters the first decorated portion 30a increases with distance from the incident portions 22, 23.

The light beam L1, which enters the first decorated portion 30a from the light-guiding portion 26, travels in the first decorated portion 30a while repeating total reflection in the first decorated portion 30a, and reaches the illumination adjustment portion 30d.

A part of the blue light which has reached the illumination adjustment portion 30d is reflected and scattered by the texturing portion, embossing portion, or micro-embossing portion formed on the illumination adjustment portion 30d, and is emitted outside as the light beam L2 from the surface of the first decorated portion 30a.

The blue light which is not emitted outside from the first decorated portion 30a further travels in the decorated portion 30, reaches the second decorated portion 30b through the third decorated portion 30c, is reflected and scattered by the rear surface of the third decorated portion 30c and the rear surface of the second decorated portion 30b, and is emitted outside from the surface of the second decorated portion 30b and the third decorated portion 30c.

As illustrated in FIG. 8, the dial 60 including the scales 6b as the designs provided on the rear surface of the first decorated portion 30a is illuminated by the transmitted light illumination with the light beam L3 emitted from the illumination member 90 provided on the rear surface side of the dial 60. Note that white light is emitted from the illumination member 90.

The light beam L3 is transmitted through the scales 6b as the designs provided in the dial 60, and is blocked by portions without having the scales 6b. Consequently, the light beam which has been transmitted through the scales 6b only enters the first decorated portion 30a from the rear surface side of the first decorated portion 30a.

The light beam L4 which has been transmitted through the scales 6b is emitted outside from the front surface side of the first decorated portion 30a.

The white light which has been transmitted through the scales 6*b* of the dial 60 appears in the blue light which is guided in the light guide member 20, and is emitted outside from the first decorated portion 30*a*. Thus, dramatic impacts by the transmitted light illumination of different colors are obtained.

As described above, according to the vehicle display 5 described in Embodiment 1, the light which is emitted from the light sources 24, 25, and enters from the incident portions 22, 23 of the light guide body made of a translucent member, for example, the light guide member 20 disposed along the outer edge portion 30*r* of the decorated portion 30, travels in the light guide member 20 while repeating the total reflection by the inner surface of the light guide member 20. In the light-guiding portion 26, the light is guided in the decorated portion 30 made of a translucent member from the inside of the light guide member 20 while the light is scattered by the inside of the decorated portion 30 and is emitted, outside. In the non-light-guiding portion 28, the light traveling inside the light guide member 20 is prevented from traveling in the decorated portion 30. With this configuration, the attenuation of the light in the light guide member 20 is controlled, and a large amount of light is guided over long distances. The decorated portion 30 is thereby illuminated by the transmitted light illumination with equal brightness even in positions away from the incident portions 22, 23.

According to the vehicle display 5 described in Embodiment 1, the scales 6*b* as the designs provided in the dial 60 disposed to overlap with the rear surface of the decorated portion 30 are illuminated by the transmitted light illumination with an illumination portion provided on the surface of the dial 60, which is on the side opposite to the side of the decorated portion 30, for example, the illumination member 90. With this configuration, after the light is guided in the decorated portion 30, the designs of the dial 60 which are illuminated by the transmitted light illumination with the illumination member 90 appear in the uniform brightness background light which is scattered outside. Dramatic impacts by the illumination are thereby obtained.

According to the vehicle display 5 described in Embodiment 1, a plurality of light-guiding portions 26 and a plurality of non-light-guiding portions 28 are alternately disposed along the outer edge portion 30*r* of the decorated portion 30. The light-guiding portions 26 are formed such that the length of each light-guiding portion 26 along the outer edge portion 30*r* of the decorated portion 30 increases with distance from the incident portions 22, 23. The non-light-guiding portions 28 are formed such that the length of each non-light-guiding portion 28 along the outer edge portion 30*r* of the decorated portion 30 decreases with distance from the incident portions 22, 23. With this configuration, the amount of light which is guided in the decorated portion 30 from the inside of the light guide body, for example, the light guide member 20 is limited in positions close to the incident portions 22, 23. The attenuation of the light which is guided in the light guide member 20 is thereby controlled, and a large amount of light is guided over long distances. As described above, the light-guiding portions 26 are formed such that the length of each light-guiding portion 26 along the outer edge portion 30*r* of the decorated portion 30 increases with distance from the incident portions 22, 23. The non-light-guiding portions 28 are formed such that the length of each non-light-guiding portion 28 along the outer edge portion 30*r* of the decorated portion 30 decreases with distance from the incident portions 22, 23. With this configuration, the amount of light which is guided in the decorated portion 30 from the inside of the light guide member 20 increases in positions far from the incident portions 22, 23. The decorated portion 30 is thereby illuminated by the transmitted light illumination with further uniform brightness even in the positions far from the incident portions 22, 23.

According to the vehicle display 5 described in Embodiment 1, a plurality of light-guiding portions 26 and a plurality of non-light-guiding portions 28 are alternately disposed along the outer edge portion 30*r* of the decorated portion 30. The light-guiding portions 26 are formed such that the length of each light-guiding portion 26 along the outer edge portion 30*r* of the decorated portion 30 increases with distance from the incident portions 22, 23. With this configuration, the amount of light which is guided in the decorated portion 30 from the inside of the light guide member 20 is limited in positions close to the incident portions 22, 23. The attenuation of the light which is guided in the light guide member 20 is thereby controlled, and a large amount of light is guided over long distances. The amount of light which is guided in the decorated portion 30 from the inside of the light guide body 20 increases in positions away from the incident portions 22, 23. The decorated portion. 30 is thereby illuminated by the transmitted light illumination with further uniform brightness even in positions away from the incident portions 22, 23.

According to the vehicle display 5 described in Embodiment 1, a plurality of light-guiding portions 26 and a plurality of non-light-guiding portions 28 are alternately disposed along the outer edge portion 30*r* of the decorated portion 30. The non-light-guiding portions 28 are formed such that the length of each non-light-guiding portion 28 along the outer edge portion 30*r* of the decorated portion 30 decreases with distance from the incident portions 22, 23. With this configuration, the attenuation of the light which is guided in the light guide member 20 is thereby controlled, and a large amount of light is guided over long distances. The amount of light which is guided in the decorated portion 30 from the inside of the light guide body 20 increases in positions away from the incident portions 22, 23. The decorated portion 30 is thereby illuminated by the transmitted light illumination with further uniform brightness even in positions away from the incident portions 22, 23.

According to the vehicle display 5 described in Embodiment 1, since the light-guiding portions 26 are formed by cementing the light guide member 20 and the decorated portion 30, the light which is guided in the light guide member 20 is guided in the decorated portion 30 from the inside of the light guide member 20 without being lost in the light-guiding portions 26. On the other hand, in the non-light-guiding portion 28, since the space 29 is provided between the light guide member 20 and the decorated portion 30, the light which is guided in the light guide member 20 is prevented from traveling in the decorated portion 30 after being reflected by the space 29. Consequently, the attenuation of the light which enters the light guide member 20 is controlled, and the light is guided over long distances. The light guide device in which the decorated portion 30 is illuminated by the transmitted light illumination with uniform brightness even in positions away from the incident portions 22, 23 is thereby achieved with a simple configuration. Furthermore, since the light guide member 20 and the decorated portion 30 are integrated, an increase in the number of components is prevented.

According to the vehicle display 5 described in Embodiment 1, since the outer circumference portion of the decorated portion 30 has a circular shape or a circular arc shape, and the light guide body, for example, the light guide member 20 is formed into a circular ring shape which has contact with the outer edge portion of the decorated portion 30 or a part of the circular ring shape, a part of an instrument such as a speed meter and a tachometer having the circular dial 60, which requires illumination, is illuminated by the transmitted light illumination with an equal light emission quality.

According to the vehicle display 5 described in Embodiment 1, since the light emitted from the light sources 24, 25 enters from the incident portions 22, 23 provided in both ends of the light guide body, for example, the light guide member 20, the light traveling in the directions opposite to each other is guided in the decorated portion 30 in the light-guiding portions 26, and is scattered by the decorated portion 30 to be emitted outside. The decorated portion 30 is illuminated by the transmitted light illumination in a position away from the incident portion. 22 with the light which enters from the other incident portion 23. Namely, the decorated portion 30 is illuminated by brighter and uniform transmitted light illumination even in positions away from the incident portions 22, 23.

According to the vehicle display 5 described in Embodiment 1, the incident portions 22, 23 bend toward the rear surface direction of the decorated portion 30. With this configuration, the light sources 24, 25 are disposed without expanding a space required for disposing the light sources 24, 25 in the radial direction of the decorated portion 30. Namely, an increase in size of the light guide device is controlled. Thus, the degree of freedom of the installation of the light guide device is improved.

In Embodiment 1, for the sake of simplifying the description, the example of illumination with white light which is transmitted through the scales 6b as the designs provided in the dial 60 and blue light which is guided in the decorated portion 30 from the light guide member 20, and is emitted outside from the first decorated portion 30a is shown. However, the light emitted from the illumination member 90 may irradiate the character portions 6a and the outer edge portion 6c of the dial 60 as the backlight to illuminate with white light similar to the scales 6b.

The light-guiding portions 26 are formed such that the length of each light-guiding portion 26 along the outer edge portion 30r of the decorated portion 30 increases with distance from the incident portions 22, 23, and the non-light-guiding portions 28 are formed such that the length of each non-light-guiding portion 28 along the outer edge portion 30r of the decorated portion 30 decreases with distance from the incident portions 22, 23. Since the specific lengths of the light-guiding portion 26 and the non-light-guiding portion 28 differ according to the size of the display and the amount of light of the light source, these are appropriately designed based on simulation or evaluation with a test model.

In Embodiment 1, although the light sources 24, 25 which emit the same blue light are disposed in both ends of the light guide member 20, the light sources 24, 25 which emit different color light may be disposed in both ends of the light guide member 20. The different color light of the two light sources 24, 25 enables the illumination color to be changed to a color mixture of light emitted from the light sources 24, 25 of different color light. Thus, illumination information is emphasized, and the dramatic impacts of the illumination are produced.

In Embodiment 1, the light guide member 20 is illuminated with the blue light sources 24, 25, and the dial 60 is illuminated with the white illumination member 90. The light sources 24, 25 and the illumination member 90 may independently turn on or turn off according to an operation of a driver and a condition of a vehicle. With this configuration, four different illumination conditions are obtained, that is, a condition in which both of the light sources 24, 25 and the illumination member 90 turn on, a condition in which the light sources 24, 25 turn on and the illumination member 90 turns off, a condition in which the light sources 24, 25 tarn off and the illumination light turns on, and a condition in which both of the light sources 24, 25 and the illumination member 90 turn off. According to such a change in, illumination condition, the emission color and the visual quality of the tachometer 10 are changed, so that dramatic impacts of the illumination are produced.

In Embodiment 1, each of the light sources 24, 25 is configured by a single color light source. By using light sources having different color emission for the light sources 24, 25, an illumination color is changed according to a condition of a vehicle. With this, the decorated portion 30 is illuminated with orange-colored light when a vehicle travels in a normal traveling mode and the decorated portion 30 is illuminated, with green-colored light when a vehicle travels in an eco-mode. Thus, the illumination color is easily switched.

A light source brightness controller which changes brightness of a light source may be provided in a driving circuit which turns on each of the light sources 24, 25, and the brightness of the light sources 24, 25 may be changed according to a condition of a vehicle. With this configuration, the brightness of the transmitted light illumination of the decorated portion 30 is changed according to a change in brightness of the light sources 24, 25, and dramatic impacts of the illumination of the decorated portion 30 are produced.

In Embodiment 1, the non-light-guiding portion 28 is formed by providing the space 29 between the light guide member 20 and the decorated portion 30. However, the configuration of the non-light-guiding portion 28 is not limited thereto. More specifically, by forming a groove or a concave section between the light guide member 20 and the decorated portion 30, the same effect is obtained even when the non-light-guiding portion 28, which prevents the light guided in the light guide member 20 from entering the decorated portion 30, is formed.

Although the embodiments of the present invention have been described above with reference to the accompanying drawings, the present invention is not limited thereto. It should be appreciated that variations may be made in the embodiments described by persons skilled in the art without departing from the scope of the present invention. For example, when each embodiment includes a plurality of configurations, the present invention certainly includes possible combination of these configurations regardless of absence of such an example. Moreover, when a plurality of embodiments and a plurality of modified examples are shown, the present invention certainly includes possible combination of configurations in these embodiments and modified examples regardless of the absence of such an example. Additionally, the present invention certainly includes configurations illustrated in the figures regardless of absence of such an example. Furthermore, the term "etc." intends to include equivalent. The terms, for example, "substantially", "about", and "approximately" intend to include a range or accuracy which is normally recognized.

CROSS-REFERENCE TO RELATED APPLICATION

The present application is based on and claims priority from Japanese Patent Application No 2012-228994, filed on Oct. 16, 2012, the disclosure of which is hereby incorporated by reference in its entirety.

REFERENCE SIGNS LIST 10 tachometer
20 light guide member (light guide body)
22, 23 incident portion
24, 25 light source
26 light-guiding portion
28 non-light-guiding portion
30 decorated portion
30r outer edge portion
50 finisher ring
60 dial
6b scale
70 lower housing member
80 shade
90 illumination member (illumination portion)

The invention claimed is:

1. A light guide device comprising:
a light source;
a light guide body including an incident portion that light emitted from the light source enters, the light guide body being made of a translucent material that guides the light from the incident portion; and
a decorated portion that is disposed to have contact with the light guide body, the decorated portion being made of a translucent material that guides the light guided in the light guide body to be emitted outside by scattering the guided light; wherein
the light guide body includes a plurality of light-guiding portions and a plurality of non-light-guiding portions, the plurality of light-guiding portions and the plurality of non-light-guiding portions being alternately disposed along an outer edge portion of the decorated portion, and
the light-guiding portions guide the light guided in the light guide body in the decorated portion,
the non-light guiding portions prevent the light guided in the light guide body from being guided in the decorated portion,
each of the light-guiding portions is formed such that its length along the outer edge portion of the decorated portion increases with distance from the incident portion in the light guide body, and
each of the non-light-guiding portions is formed such that its length along the outer edge portion of the decorated portion decreases with distance from the incident portion in the light guide body.

2. The light guide device according to claim 1, further comprising:
a dial including a design that is disposed to overlap with a rear surface of the decorated portion; and
an illumination portion that is disposed on a surface of the dial, which is on a side opposite to a side of the decorated portion, to illuminate the design of the dial by transmitted light illumination, wherein
the light which has illuminated the dial by the transmitted light illumination with the illumination portion enters the decorated portion, and is emitted from a surface of the decorated portion.

3. The light guide device according to claim 1, wherein the light-guiding portions are formed by cementing the light guide body and the decorated portion, and the non-light guiding portion is portions are formed with a space between the light guide body and the decorated portion.

4. The light guide device according to claim 1, wherein the light-guiding portions are formed by cementing the light guide body and the decorated portion, and the non-light-guiding portions are formed with a groove or a concave between the light guide body and the decorated portion.

5. The light guide device according to claim 1, wherein an outer circumference portion of the decorated portion has a circular shape or a circular arc shape, the light guide body has a circular ring shape that has contact with an outer edge portion of the decorated portion or a part of the circular ring shape.

6. The light guide device according to claim 1, wherein the light guide body includes on both ends thereof an incident portion.

7. The light guide device according to claim 1, wherein the incident portion bends toward a rear surface direction of the decorated portion.

8. The light guide device according to claim 1, further comprising
a light source brightness controller that controls brightness of the light source.

9. A light guide device comprising:
a light source;
a light guide body including an incident portion that light emitted from the light source enters, the light guide body being made of a translucent material that guides the light from the incident portion; and
a decorated portion that is disposed to have contact with the light guide body, the decorated portion being made of a translucent material that guides the light guided in the light guide body to be emitted outside by scattering the guided light; wherein
the light guide body includes a plurality of light-guiding portions and a plurality of non-light-guiding portions, the plurality of light-guiding portions and the plurality of non-light-guiding portions being alternately disposed along an outer edge portion of the decorated portion, and
the light-guiding portions guide the light guided in the light guide body in the decorated portion,
the non-light guiding portions prevent the light guided in the light guide body from being guided in the decorated portion,
each of the light-guiding portions is formed such that its length along the outer edge portion of the decorated portion increases with distance from the incident portion in the light guide body, and
each of the non-light-guiding portions is formed to have an equal length along the outer edge portion of the decorated portion in the light guide body.

10. The light guide device according to claim 9, further comprising:
a dial including a design that is disposed to overlap with a rear surface of the decorated portion; and
an illumination portion that is disposed on a surface of the dial, which is on a side opposite to a side of the decorated portion, to illuminate the design of the dial by transmitted light illumination, wherein the light which has illuminated the dial by the transmitted light illumination with the illumination portion enters the decorated portion, and is emitted from a surface of the decorated portion.

11. The light guide device according to claim 9, wherein the light-guiding portions are formed by cementing the light guide body and the decorated portion, and the non-light guiding portions are formed with a space between the light guide body and the decorated portion.

12. The light guide device according to claim 9, wherein the light-guiding portions are formed by cementing the light guide body and the decorated portion, and
the non-light-guiding portions are formed with a groove or a concave between the light guide body and the decorated portion.

13. The light guide device according to claim 9, wherein the light guide body includes on both ends thereof an incident portion.

14. The light guide device according to claim 9, further comprising
a light source brightness controller that controls brightness of the light source.

15. A light guide device comprising:
a light source;
a light guide body including an incident portion that light emitted from the light source enters, the light guide body being made of a translucent material that guides the light from the incident portion; and
a decorated portion that is disposed to have contact with the light guide body, the decorated portion being made of a translucent material that guides the light guided in the light guide body to be emitted outside by scattering the guided light; wherein
the light guide body includes a plurality of light-guiding portions and a plurality of non-light-guiding portions, the plurality of light-guiding portions and the plurality of non-light-guiding portions being alternately disposed along an outer edge portion of the decorated portion, and
the light-guiding portions guide the light guided in the light guide body in the decorated portion,
the non-light guiding portions prevent the light guided in the light guide body from being guided in the decorated portion,
each of the light-guiding portions is formed to have an equal length along the outer edge portion of the decorated portion in the light guide body, and
each of the non-light-guiding portions is formed such that its length along the outer edge portion of the decorated portion decreases with distance from the incident portion in the light guide body.

16. The light guide device according to claim 15, further comprising:
a dial including a design that is disposed to overlap with a rear surface of the decorated portion; and
an illumination portion that is disposed on a surface of the dial, which is on a side opposite to a side of the decorated portion, to illuminate the design of the dial by transmitted light illumination, wherein
the light which has illuminated the dial by the transmitted light illumination with the illumination portion enters the decorated portion, and is emitted from a surface of the decorated portion.

17. The light guide device according to claim 15, wherein the light-guiding portions are formed by cementing the light guide body and the decorated portion, and the non-light guiding portions are formed with a space between the light guide body and the decorated portion.

18. The light guide device according to claim 15, wherein the light-guiding portions are formed by cementing the light guide body and the decorated portion, and
the non-light-guiding portions are formed with a groove or a concave between the light guide body and the decorated portion.

19. The light guide device according to claim 15, wherein the light guide body includes on both ends thereof an incident portion.

20. The light guide device according to claim 15, further comprising
a light source brightness controller that controls brightness of the light source.

* * * * *